UNITED STATES PATENT OFFICE.

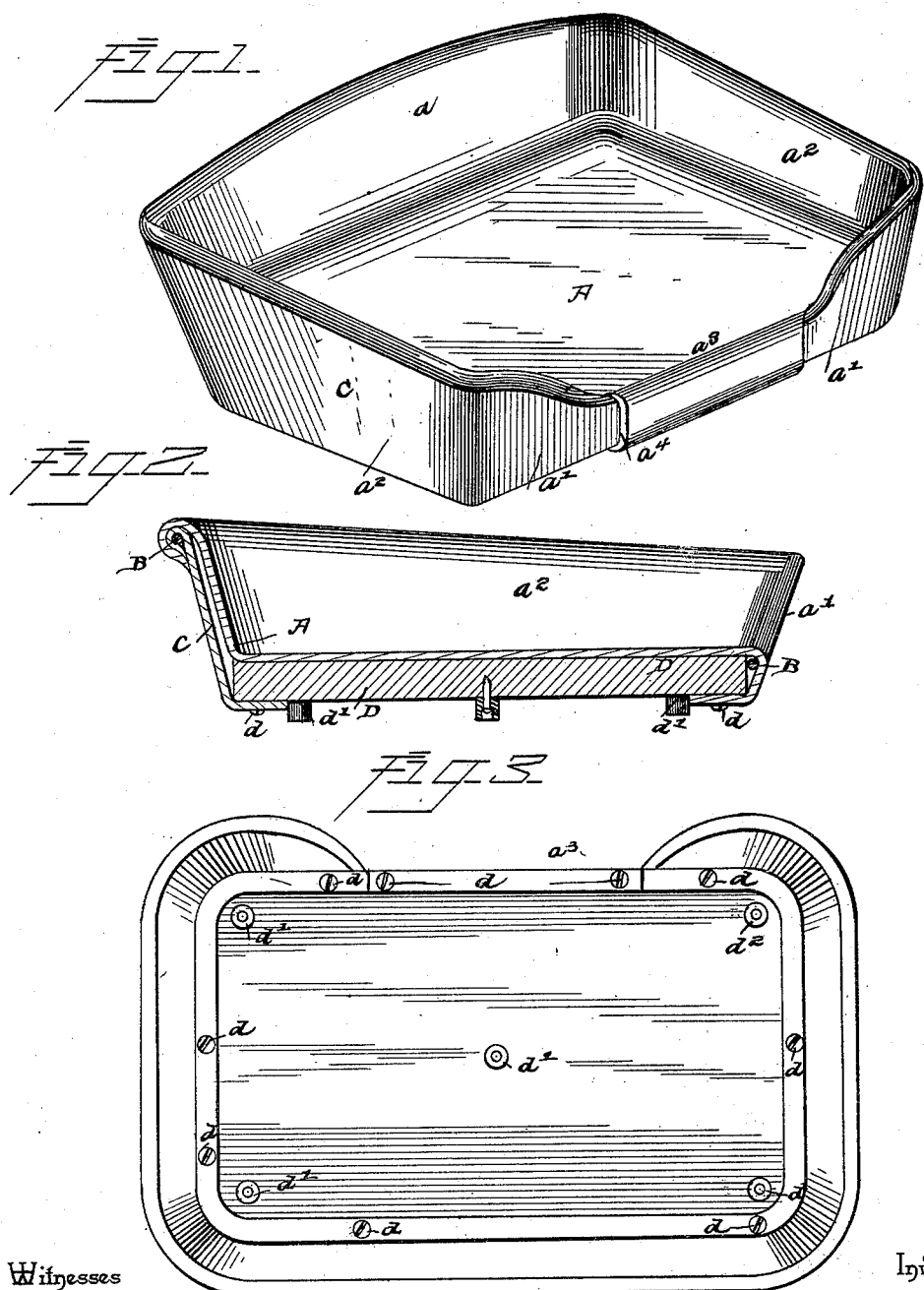

ARTHUR S. E. METCALF, OF AMBERG, WISCONSIN.

BREAD-BOARD.

SPECIFICATION forming part of Letters Patent No. 457,052, dated August 4, 1891.

Application filed January 30, 1891. Serial No. 379,696. (No model.)

*To all whom it may concern:*

Be it known that I, ARTHUR S. E. METCALF, a citizen of the United States, residing at Amberg, in the county of Marinette and State of Wisconsin, have invented a new and useful Bread-Board, of which the following is a specification.

My invention is an improvement in bread-boards, and has for its object the construction of a bread-board which will be simple, durable, and inexpensive.

With these objects in view the invention resides in the various novel details of construction, and in the combination of parts hereinafter fully described, and particularly pointed out in the claims.

In the drawings in which I have illustrated my invention, and in which like letters and figures of reference indicate corresponding parts, Figure 1 is a perspective view of my bread-board. Fig. 2 is a sectional view thereof, and Fig. 3 is an inverted plan view.

In the drawings, the letter A designates a face or upper sheet of metal, by preference tin, which has its upper edge bent over a wire B and brought down against the outer sheet of metal C, which is likewise preferably tin and has its upper edge bent over the wire B.

D indicates a board of light wood, which is secured to the under part of the device by means of the lower edges of the outer sheet being bent under the said board and fastened thereto by screws $d$.

$d'$ indicates rubber pads, which I attach to the board D for the purpose of preventing the bread-board from marring or scratching surfaces upon which it may be placed.

As will be seen from the drawings, I so shape my bread-board that the side $a$ will be higher than the side $a'$, which is opposite thereto, and I make the connecting sides $a^2$ slope from the side $a$ to the side $a'$. The side $a'$ is cut away about the center of its length, as is shown at $a^3$, and the upper sheet of metal has a tongue $a^4$ brought down through said cut-away portion and secured beneath the board D, the opening thus formed in side $a'$ enabling dough to be more easily taken from the board. The tongue $a^4$ is brought down through said opening in order to make a smooth edge there.

By making the bread-board of tin or other metal in the manner shown and described the same may be constructed without seams, chinks, or crannies for dough or flour to get into, become sour, or mold therein, and the particular shape of the board enables the kneader to work the dough against the outer side $a$ and away from himself, thus giving a freer arm motion, relieving the kneader from the strain that necessarily follows when the dough is worked in one position. It will be readily observed that the rubber pads $d'$ will prevent the bread-board from slipping upon the table or wherever it is used.

It will be evident that the upper bent edges of the sheets A and C combine to form a connecting means therein between, and also combine to form a stiffening bead or rim, so that, if desired, the wire B may be omitted entirely, although I prefer to use the same, as it renders the bead stiffer and the connection or union stronger.

Having thus fully described my invention, what I claim as new, and desire to secure by Letters Patent, is—

1. In a bread-board, the combination, with an upper sheet of metal, an outer sheet of metal, a board arranged below the upper sheet and secured thereto by the edges of the outer sheet being bent under and fastened to it, a wire surrounding the upper edges of the bread-board and forming a core upon which the two sheets are bent over against the outer sheet, substantially as and for the purpose set forth.

2. In a bread-board constructed of metal and wood, as described, the side $a$ of a greater elevation from the base than the side $a'$, the connecting sides sloping from the side $a$ to the side $a'$, the side $a'$ being cut away, as shown at $a^3$, and the upper sheet being provided with a tongue $a^4$, which is brought through the cut-away portion $a^3$ and bent under the bread-board, substantially as and for the purpose set forth.

3. In a bread-board, the combination, with the board D, of a sheet of metal A on the upper side of said board, an outer sheet of metal C, having its lower edges extending under the board and secured thereto by screws, a wire B, having the upper edge of the sheet A bent over it against the outer sheet C, the upper edges of the bread-board sloping from the side $a$ to the side $a'$, the side $a'$ being cut away at $a^3$, through which extends a tongue $a^4$ of the upper sheet A, which tongue is bent down and under the board D, and the board D having the pads $d'$, substantially as and for the purpose set forth.

4. A bread-board constructed of an upper sheet of metal A and an outer sheet of metal C, the two sheets having their meeting edges seamed together, and a board D constituting the bottom, and over and around which board the said sheets of metal are placed, so as to provide a metal lined and faced wooden bread-board, substantially as described.

In testimony that I claim the foregoing as my own I have hereto affixed my signature in presence of two witnesses.

ARTHUR S. E. METCALF.

Witnesses:
E. S. SPEARS,
LOUIS W. REDEMAN.